June 13, 1944.   G. DEAKIN   2,351,016
ELECTRICAL CONTROL SYSTEM
Filed Sept. 14, 1942   7 Sheets-Sheet 3
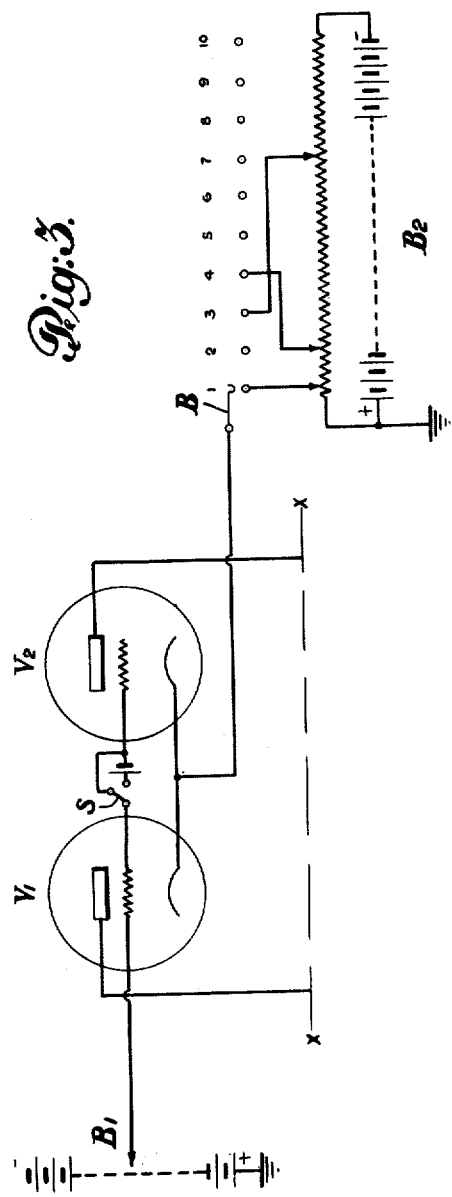
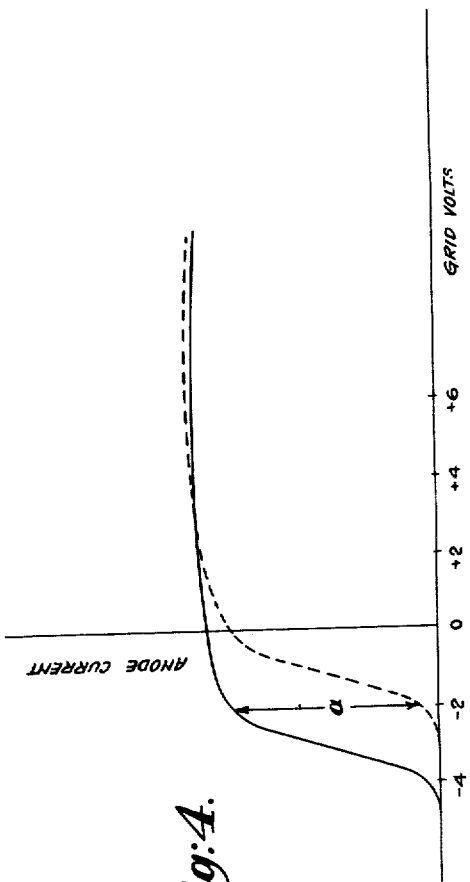
INVENTOR.
GERALD DEAKIN
BY
ATTORNEY

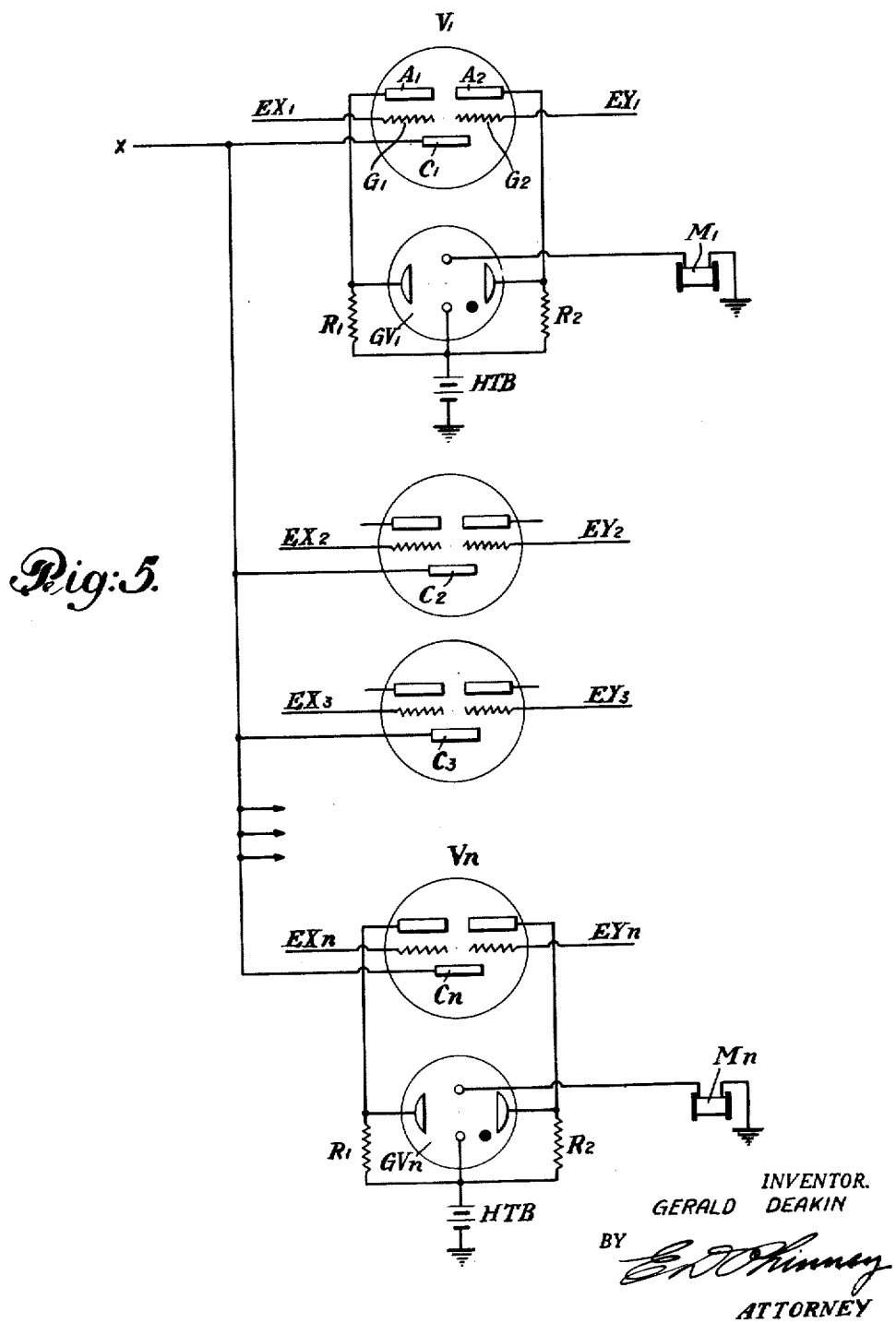

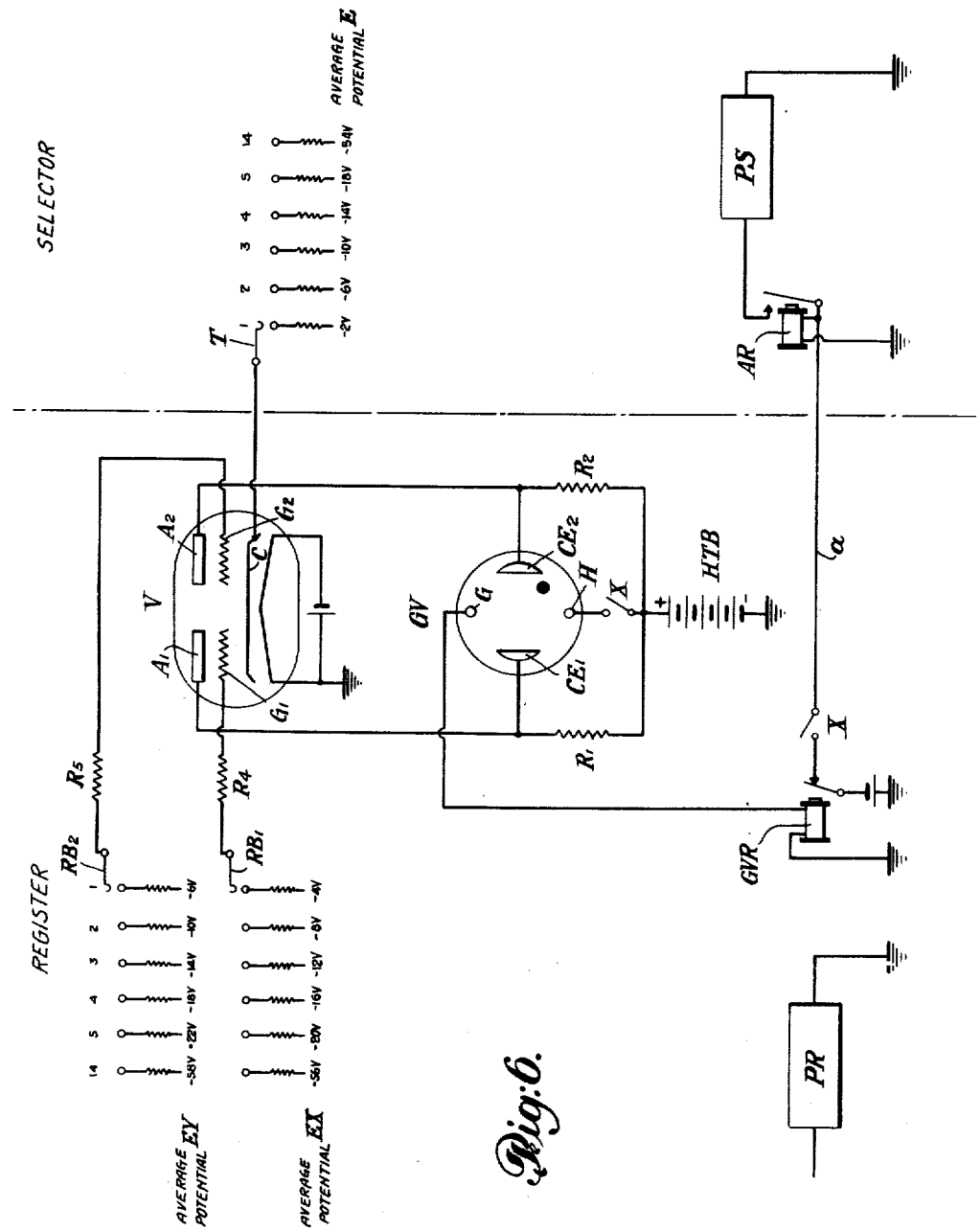

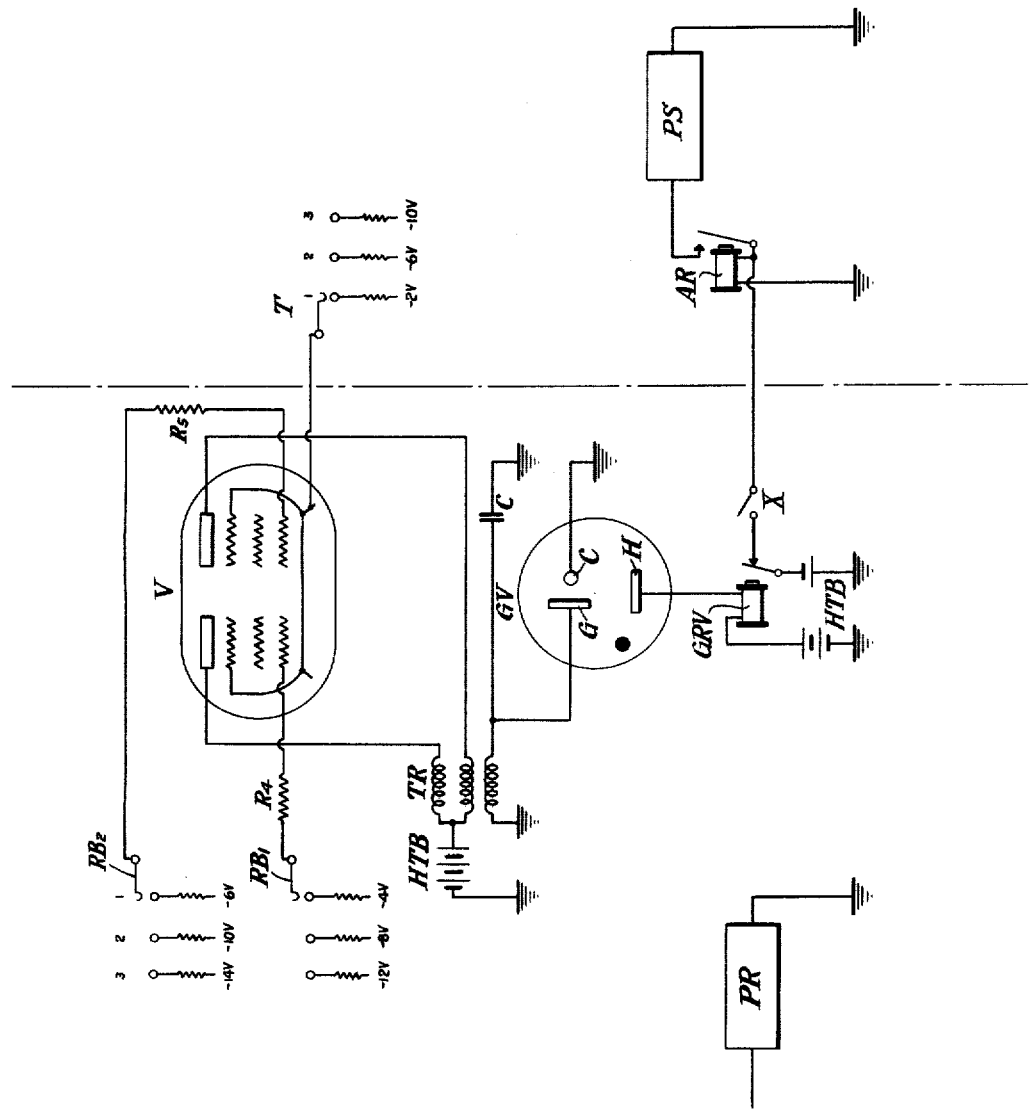

Patented June 13, 1944

2,351,016

UNITED STATES PATENT OFFICE 2,351,016

ELECTRICAL CONTROL SYSTEM

Gerald Deakin, New York, N. Y., assignor to International Standard Electric Corporation, New York, N. Y., a corporation of Delaware Application September 14, 1942, Serial No. 458,297

23 Claims. (Cl. 179—16)

This invention relates to electrical control systems of the kind adapted for the control of switching apparatus in telecommunication systems, remote control systems and the like, and for the selective operation of other apparatus such as electric elevators, gun control, calculating machines, telegraph printers, or ticket printers.

One object of the invention is the provision of a control circuit which is adapted to respond instantaneously to a desired potential or range of potentials.

Another object of the invention is the provision of a control circuit which will effectively and instantaneously arrest the movement of an operating mechanism such as a selector switch, or whicn will actuate a selected one of a number of operating mechanisms, responsive to the application of a predetermined potential to a control circuit or conductor.

A still further object is the provision of a control circuit for controlling the operation of selector switches in a telecommunication system in which the lines or groups of lines accessible to a selector switch are distinguished by characteristic and different direct current potentials, whilst affording the facility that a switch will be caused to hunt continuously until a wanted line or an idle line of a wanted group of lines becomes available.

Figure 1:
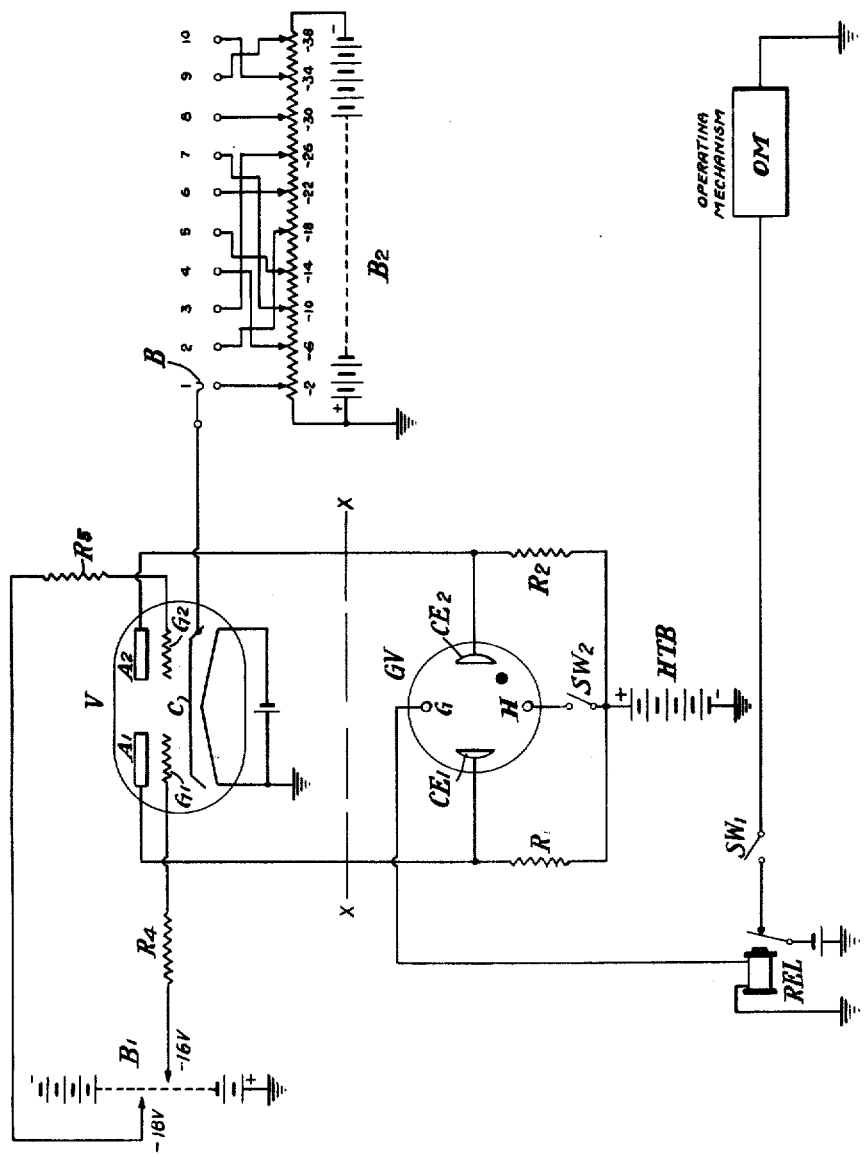
Figure 2:
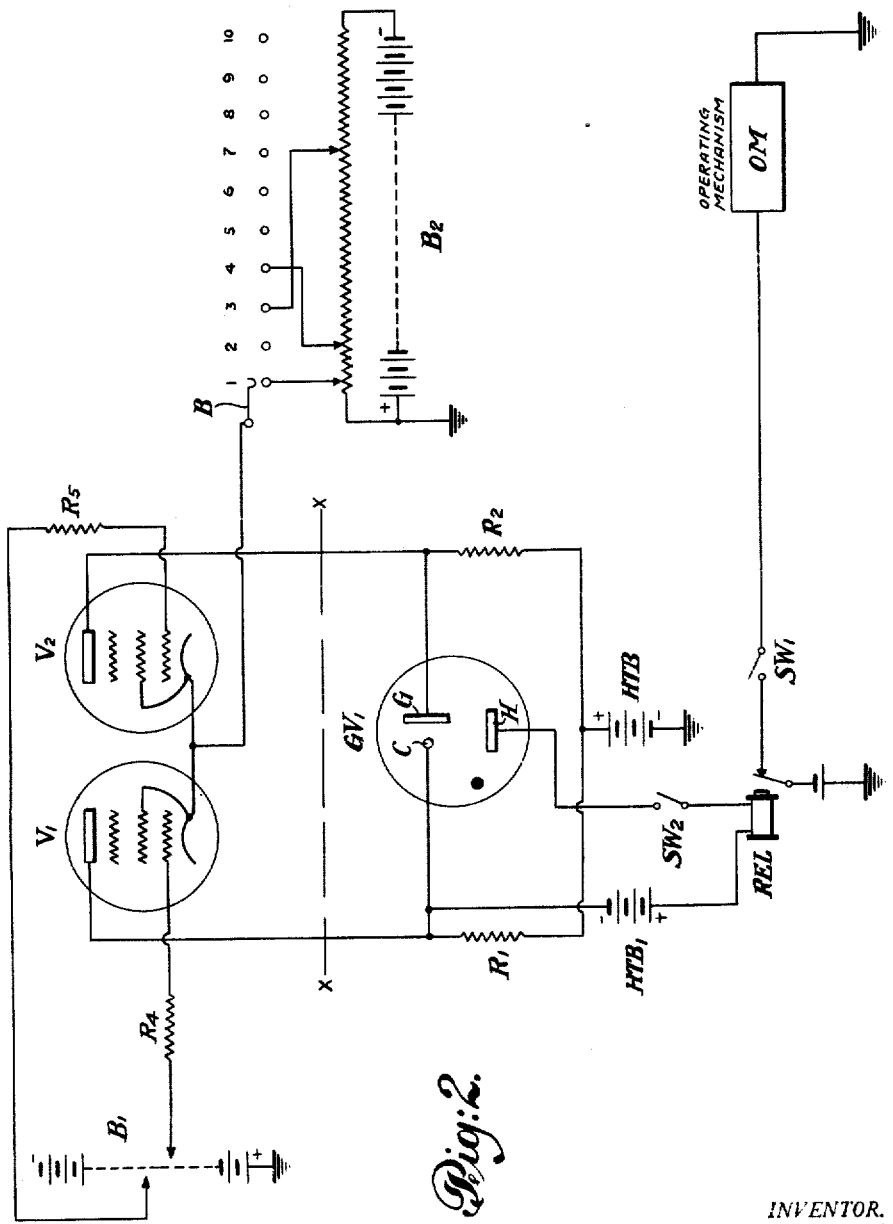

These and other objects of the invention will be clear from a consideration of the following description taken in conjunction with the accompanying drawings in which, Fig. 1 is a circuit diagram illustrating an application of my invention to the selective control of an operating mechanism, Fig. 2 is a further embodiment of my invention in which a three electrode gas tube is used, Fig. 3 shows a modification of part of the circuit of Fig. 1, Fig. 2, Fig. 4 are tube characteristics referred to in the description, Fig. 5 is a modification showing how my invention may be employed for the instantaneous selective actuation of any one or more of a plurality of controls, and Fig. 6 shows how my invention may be applied to the control of selector switches in a telecommunication system.

Figure 8:
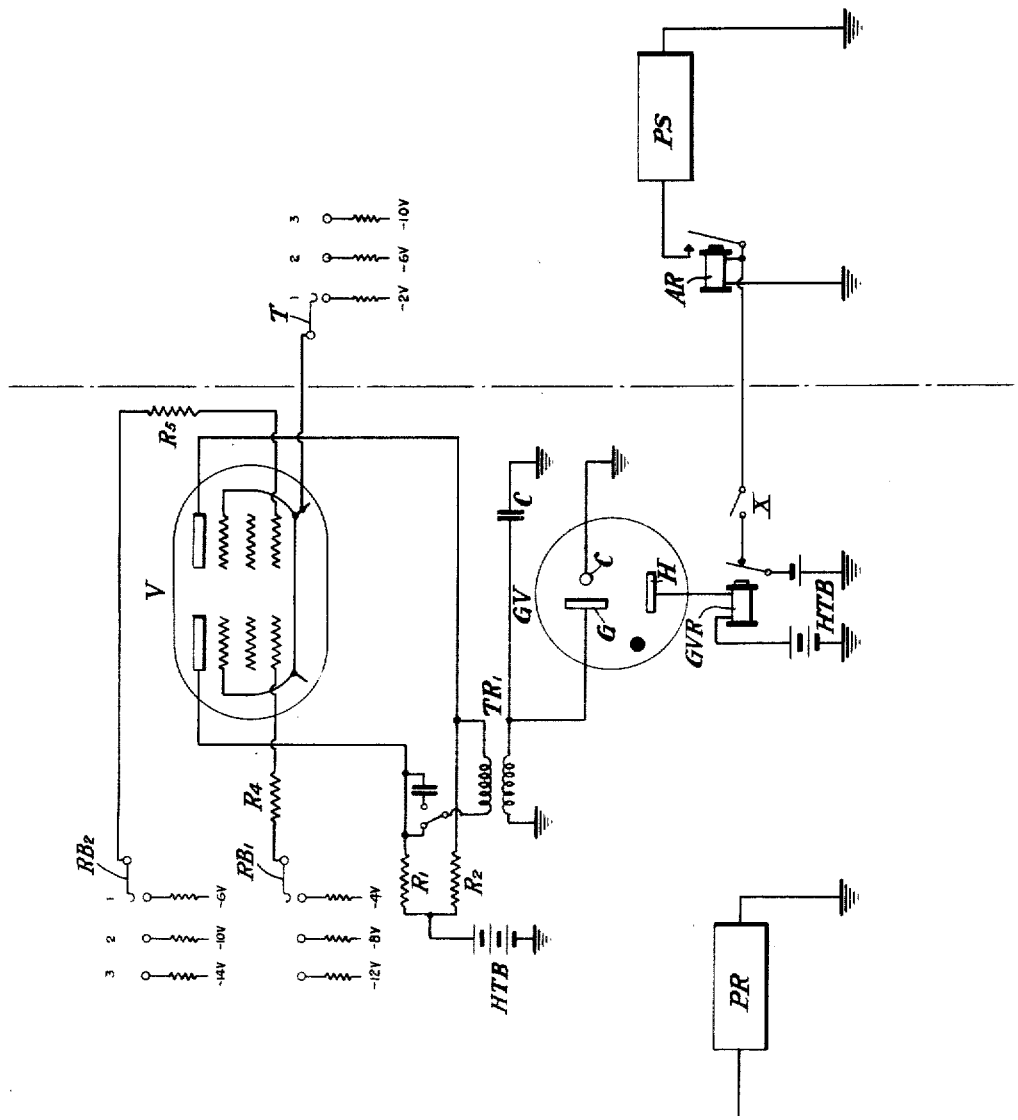

Figs. 7 and 8 show further embodiments of my invention.

Fig. 1 shows the fundamental control circuit according to my invention, which consists of a twin triode vacuum tube V and a cold cathode gas tube GV having two control electrodes CE1 and CE2 constituting an auxiliary gap and two main gap electrodes G and H. The positive terminal of a high tension battery HTB is connected to one of the main gap electrodes H of tube GV over a switch SW2 and over load resistances R1 and R2, respectively, to the anodes A1 and A2 of the tube V. The upper ends of the resistances R1 and R2 are respectively connected to the auxiliary gap control electrodes CE1 and CE2 of the gas tube GV. The resistances R1, R2, are all of the order of 50,000 to 100,000 ohms depending upon the high tension voltage used and the characteristics of tube V. It will be seen that the positive potentials on the control electrodes CE1 and CE2 are normally the same and thus there is no tendency for the tube GV to ionize.

The object of the circuit is to permit the placing of a plurality of pairs of potentials on the control grids G1 and G2, respectively, of the tube V in such manner that for each pair of potentials there is a critical potential for the cathode C which when realized, and only when realized, will cause a much greater flow of current through resistance R1 than through resistance R2 or vice versa, thereby lowering the potential of CE1 with respect to CE2 to the breakdown voltage of the control gap which in certain gas tubes now in use is in the neighborhood of 70 volts. When any other potential, either positive or negative and differing from the critical potential by more than a certain minimum amount determined by the tube characteristics, is applied to the cathode C, the currents through resistances R1 and R2, respectively, remain sufficiently close together to prevent a breakdown potential from developing across the auxiliary gap CE1, CE2 of the gas tube GV.

In Fig. 1 there is shown diagrammatically means for applying different selected potentials from a battery B1 to the control grids G1 and G2, respectively, over resistance R4 and R5. Potentiometers or tapping points between storage cells may equally well be used. The cathode C of tube V is connected to a brush B which is arranged to wipe over a number of terminals 1 to 10 under the control of an operating mechanism OM. The terminals 1 to 10 represent a plurality of selections, operations or controls of any desired kind. They may, for example, represent various operations which it is desired to control e. g. from a remote point, such as the control of switching operations, calculating machines, ticket printers, industrial controls, etc. A distinctive potential tapped from a potentiometer connected across a battery B2 or taken directly from the battery is applied to each terminal I to 10, the potentials increasing in steps of say 4 volts. It is not necessary, however, that the potentials of the terminals are in regular ascending order. The same battery or other source of potential may be used for B1 and B2.

A control relay or contactor REL is connected to the main gap electrode G and is thus in the main gap circuit. The armature of relay REL in its operated position opens the circuit of the operating mechanism OM.

The switch SW1 is adapted to close the circuit of the operating mechanism OM. The function of the switch SW2 is to open the main gap circuit to deionize the gas tube GV after the desired selection has been effected. The switch SW2 may be actuated automatically under the control for example of another relay controlled by relay REL.

In the arrangement illustrated, the tube V is chosen to have such a characteristic that only when the approximate potential of G1 is $-2$ volts with respect to cathode C and the approximate potential of G2 is $-4$ volts with respect to C is the difference between the anode currents of the two discharge paths sufficient to develop a voltage between the control electrodes CE1 and CE2 of the gas tube GV which will ionize this tube. When the grids G1 and G2 become more negative, the difference between the respective anode currents is insufficient to develop a breakdown voltage between CE1 and CE2 and when both grids are very negative no anode current will flow through either tube. When both grids G1 and G2 are positive with respect to the cathode approximately the same currents flow through the two discharge paths since the grid resistances R4 and R5 which are of the order of 100,000 ohms depending upon the battery voltage and tube characteristics, maintain both the grids at substantially zero potential, this being due to the action of grid current which appears as soon as the grid tends to go positive.

Assume now, for example, that it is desired to effect a desired selective operation by stopping the brush B on terminal 5 which is connected to $-14$ volts. Grid G1 is arbitrarily connected to a $-16$ volts tapping on battery B1 and grid G2 to a $-18$ volt tapping on this battery. Switch SW1 is closed manually or automatically to complete the circuit of the operating mechanism OM which advances the brush B over the contacts I to 10. The switch SW2 is also closed to connect the high tension battery HTB to the main gap electrode H.

When brush B engages terminal I which is connected to $-2$ volts, the potential of grid G1 is $-14$ volts and that of grid G2 $-16$ volts relative to the cathode C. As already explained, substantially no current flows through either discharge path and the gas tube GV will not fire. In the second position, on terminal 2, zero potential is applied to cathode C, this position being assumed to be inactive. Thus the potential of G1 is $-16$ volts and G2 is $-18$ volts and again no current flows over either discharge path. On terminal 3 the respective potentials of G1 and G2 are $+10$ volts and $+8$ volts relative to the cathode, and on terminal 4, $-10$ volts and $-12$ volts, and in neither position will the gas tube GV fire. In position 5 the potential on G1 is $-2$ volts and that on G2 is $-4$ volts. These are the critical voltages previously mentioned which cause a considerable current to flow through R1 but not through R2 whereby a breakdown voltage is developed across the auxiliary gap CE1.CE2 and the gas tube GV fires. When the auxiliary or control gap is ionized, the main gap GH also ionizes instantly and energizes relay REL which opens its back contact and opens the circuit of the operating mechanism OM.

It will be appreciated that any double tube having suitable characteristics may be used for the tube V. Thus double tetrodes or double pentodes may be employed instead of double triodes. Two separate tubes may, of course, be employed instead of the double tube illustrated, and in fact the pentode RCA 6SH7 with a high tension battery of 175 volts has been found to operate satisfactorily.

It is also understood that the current in the main gap circuit of the gas tube GV may be used in any convenient manner to control the operating mechanism. A potential developed across a load resistor may, for example, be used as the starting voltage of a Thyratron which is arranged to control the operating mechanism.

The operating mechanism OM may be arranged to advance a slider over the potentiometer across battery B2 so that when a potential which matches the potentials on grids G1 and G2 is reached the gas tube will fire and stop the operating mechanism.

The characteristics of the tube V may be chosen to provide any required degree of tolerance in regard to the critical voltages which must be present between the respective control grids and the cathode of this tube in order to cause the gas tube GV to fire. When, for example, storage batteries are used as the source of potential it may be arranged that the gas tube will fire when the voltage of grid G1 relative to the cathode is between $-1.8$ and $-2.3$ and that of the grid G2 relative to the cathode is between $-3.6$ and $-4.6$. In other applications, however, the critical voltages may be required to be held within narrower or broader limits.

Fig. 2 shows a modification of Fig. 1 in which the twin triode V of Fig. 1 is replaced by two pentodes V1 and V2 and the four-electrode gas tube GV is replaced by a three-electrode gas tube GV1. In this arrangement it is necessary to employ a separate high tension battery HTB1 for the main discharge path C, H of the gas tube GV1. As in the circuit of Fig. 1 when the critical potentials which match the potential on brush B are applied to the control grids of tubes V1 and V2, or vice versa, currents of sufficiently different magnitudes flow in the anode-cathode circuits of the tubes V1, V2 to develop a potential different at the upper ends of the load resistors R1 and R2 great enough to fire the auxiliary gap CG. The tube GV1 is thereby ionized, the main gap CH strikes and the relay REL is energized.

Instead of employing, as in Fig. 1, a twin tube V, the two halves of which have similar characteristics, or, as in Fig. 2, two separate tubes V1 and V2 having similar characteristics, together with means for applying predetermined critical potentials to the respective control electrodes thereof, two tubes V1, V2, Fig. 3, may be employed having inherently different characteristics, or alternatively there may be used two similar tubes suitably biased to work on different points of their characteristics. In this arrangement it is only necessary to apply the same critical potential to both control grids.

Fig. 4 shows in the full line curve the grid volts—anode current characteristic of a suitable tube which may be used if both tubes V1 and V2 of Fig. 3 are to have similar characteristics. With switch S in its lower position tube V1 is unbiased, whereas the grid of V2 is biased say two volts negative by a small battery C. It will be noted that if the potential applied to both grids from battery B1 is approximately two volts more negative than the potential applied to both cathodes over brush B, a large anode current flows through tube V1 but only a very small anode current flows through tube V2. The difference $a$ in anode current is sufficiently great to develop a firing potential across the auxiliary gap of the gas tube. It will be seen, however, from an inspection of the curve that for all other voltage differences between the brush B and the tap on the battery B1, the difference in the respective anode currents is substantially less, and it can be arranged that the gas tube GV will not fire responsive to a potential difference developed by such currents.

Instead of differently biassing the respective tubes V1 and V2, the tubes may be chosen to have different characteristics. For example, one tube may be chosen to have a characteristic as shown in the full line curve on Fig. 4 and the other a different characteristic, as shown in the dotted line curve. It will be appreciated from an inspection of these curves that when and only when a potential of approximately −2 volts with respect to the cathodes is applied to both grids will there exist a substantial difference between the anode currents in the two tubes. In this modification the grid bias battery C will be removed by the switch S.

It will be appreciated that instead of applying two different predetermined potentials to respective control electrodes of two discharge paths from potential source B1 and a common potential to the two cathodes (Fig. 2) or to a common cathode (Fig. 1) over brush B, the common potential may be applied to the two control electrodes in parallel and the two different potentials applied respectively to two separate cathodes.

In any of the modifications described, an electromagnetic relay may be employed in place of the gas tube GV. In this case the relay winding may be connected directly across the upper ends of the resistances R1, R2 so as to be energized responsive to the potential difference developed across these points. Alternatively a relay might be provided having differential windings replacing the resistances R1 and R2 or connected serially therewith. In this case the relay would operate only when there is a considerable difference in the currents through the two windings, which would correspond to the case when the difference in the drops through the resistances R1 and R2 are sufficient to operate the gas tube GV of Fig. 1 or GV1 of Fig. 2.

As illustrated in Fig. 5, the invention may also be employed for the instantaneous operation of any one or more of a plurality of controls responsive to the application of a predetermined potential to a single control conductor. An individual control circuit comprising a dual thermionic emission tube (V1—Vn), and a gas tube (GV1—GVn) similar to the circuit V—GV of Fig. 1 is provided for each control, selected pairs of potentials EX1—EY1—EXn—EYn being applied in any suitable manner to the respective grid electrodes G1, G2 of each dual tube V1—Vn and the cathodes C1—Cn of all the tubes V1—Vn being connected in multiple to a control conductor X. Relays M1—Mn or other current or voltage responsive devices are connected in the main gap circuits of the gas tubes GV1—GVn.

It will be appreciated that when a selected potential (E1—En) is applied in any desired manner to the control wire X and thus to the common cathode circuit, only that thermionic emission tube (or tubes) the respective potentials (EX,EY) on the grids of which are matched to this selected potential, will pass anode currents sufficiently different in magnitude to set up a voltage difference across the auxiliary gap of the associated gas tube (GV1—GVn), large enough to fire the tube and cause the energization of the control relay (M1—Mn).

The control circuit of the invention is particularly well adapted to the control of high speed selector switches in tele-communication systems. Fig. 6 illustrates one way in which the control circuit of the invention may be adapted to the control of a selector switch in an automatic telephone exchange system. Components in Fig. 6 similar to components in Fig. 1 are indicated by like reference letters.

A battery of storage cells or potentiometers may be used to obtain the various D. C. potentials. The use of storage cells, particularly the cells of the regular central office 24 cell, 48 volt battery is preferred. It is proposed to start, for example, with a potential EX on grid G1, having a value of approximately −4 volts, that is, the average potential at the second cell of the exchange storage battery. This battery has its positive pole grounded. The EX potential may vary during the operation of the exchange from 3.6 volts minimum to 4.6 volts maximum. A negative potential EY, always higher by the potential of one storage cell, thus starting with an average of 6 volts, minimum 5.4 volts maximum of 6.9 volts, is placed on grid G2. These are the first pair of potentials. The remaining potentials up to 14 increase by steps of 4 volts. Should the subscriber dial the digit 4, with the normal register arrangement brush RB1 will advance under control of power magnet PR to the 4th terminal and will place potential EX of approximately −16 volts on grid G1 and brush RB2 will place potential EY of approximately −18 volts on grid G2.

When the register or other controlling device has placed a particular pair of potentials on grids G1 and G2, in the above mentioned case, −16 volts on G1 and −18 volts on G2, the selector circuit is closed at a contact X in any known manner, for example by a relay energized after the commencement of dialling of a digit, thus closing the driving circuit of the selector from battery at the back of relay GVR of the register through relay AR of the selector to ground and over a front contact of relay AR through the selector clutch magnet PS to ground. Brush T of the selector advances. It first tests terminal 1 which has an average E potential of −2 volts. It then tests terminal 2 which has an average E potential of −10 volts. In these three cases both grids G1 and G2 are sufficiently negative with respect to the cathode to prevent any appreciable current from flowing through R1 and R2 so that a breakdown potential is not developed across the control gap of GV. When brush T reaches terminal 4 an average E potential of −14 volts is placed on the cathode C. The characteristic of tube V is such that with the cathode C at this potential and the grid G1 at −16 volts and grid G2 at −18 volts, a considerable flow of current takes place through R1 but not through R2, thus a breakdown potential is developed and GV fires. When the control gap is ionized, the main gap ionizes instantly and operates relay GVR which opens its back contact and releases relay AR and the clutch of the selector, thereby causing brush T to come to rest on terminal 4.

Should terminal 4 be busy, the E potential will not be present and the terminal circuit will be either grounded or open, for example, by a relay in another selector which has engaged the outlet. In either case the grids G1 and G2 will be sufficiently negative with respect to C so that no appreciable current will flow through R1 or R2 gas tube and GV will not fire.

As the system provides for continuous hunting at the group selectors, a group selector will pass over the wanted group in case all trunks in it are busy and will test the groups beyond and then restart the test all over again. When brush T reaches the terminal beyond, in this case terminal 5, it will find an average E potential of —18 volts on the terminal. This will make grid G1 positive by 2 volts with respect to C and grid G2 will have the same potential as C. The characteristics of V and its associated circuits are such that under these conditions approximately equal currents flow through R1 and R2 and a breakdown potential is not developed in GV. As T tests terminals still more negative, approximately equal currents continue to flow through R1 and R2, but a breakdown potential is not developed in GV.

It has been assumed that the desirable difference in potential between E and EX is approximately 2 volts, but it may be found desirable to increase or decrease this difference to make the best use of the characteristics of the tube V so as to obtain the maximum difference in current through R1 and R2 when the cathode reaches the critical potential.

The operation of the combination of tubes V and GV is practically instantaneous, thus the controlling factor in the speed of hunting is the speed with which relay GVR may be made to open its back contact and the speed with which PS may be made to release and stop the selector. It is known that speeds as high as 120 terminals per second can be obtained without overstepping and that safe speeds as high as 80 are practicable. By a safe speed is meant a speed under which the brushes will make contact with their corresponding terminals with ample margin so as to eliminate all possibility of one or more brushes becoming disconnected from their corresponding terminals.

In Fig. 6 relays AR and power magnet PS are energized in multiple, thus a relatively heavy current flows over the "a" wire to the back contact of relay GVR. This connection provides for the maximum speed of release. However, a sufficiently quick release may possibly be made by connecting only relay AR to the back contact of relay GVR and operating power magnet PS over a front contact of relay AR, the armature which would be connected to battery. In this alternative relay AR must break its front contact before the power magnet can release. With this second arrangement a relatively light current flows over the selector contacts and the back contact of relay GVR.

In the further modification shown in Fig. 7 the high tension battery HTB is connected over two differential windings of a transformer TR to the respective anodes of the tube V. A third winding of the transformer TR is grounded at one end and at the other end is connected to an auxiliary electrode of a three-electrode gas tube at GV and over a condenser C to ground.

When the potentials applied to the cathode over test brush T matches the potentials applied to the grids of tube V a strong pulse of current induced in the third winding of transformer TR fires the auxiliary gap G, C, of the gas tube GV which ionizes and strikes its main gap G, H, thereby energizing the relay GVR.

Fig. 8 shows a circuit somewhat similar to Fig. 7 except that the transformer $TR_1$ has a single primary winding connected either directly or through a condenser across two resistors R1 and R2 which function to produce a differential voltage drop just as described in conjunction with Fig. 1 where the critical test voltage is applied at T the difference in currents through resistors R1, R2 cause a voltage drop across the primary of transformer $TR_1$ sufficient to fire the gas tube GV.

Other application and embodiments coming within the scope of the invention as defined in the appended claims will occur to those versed in the art.

What is claimed is:

1. An electrical control system comprising two current conducting means having different voltage-current characteristics such that for a predetermined voltage applied to them the difference between the magnitudes of the currents flowing through them is a maximum and for voltages either greater or less than said predetermined voltage the said current difference rapidly decreases, means for deriving from said currents a potential difference dependent upon said current difference, a control means arranged to be actuated only by a potential exceeding a predetermined value, and means for applying said potential difference to said control means.

2. An electrical control system comprising two current conducting means having different non-linear voltage-current characteristics such that for a predetermined voltage applied to them the difference between the magnitudes of the currents flowing through them is a maximum and for voltages either greater or less than said predetermined voltage the said current difference rapidly decreases, means for deriving from said currents a potential difference dependent upon said current difference, a control means arranged to be actuated only by a potential exceeding a predetermined value, and means for applying said potential difference to said control means.

3. An electrical control system comprising two current conducting means having similar non-linear voltage-current characteristics such that for two predetermined voltages applied respectively to said current conducting means the difference between the currents flowing through them is a maximum, means for deriving from the currents flowing through said conducting means potentials of a value dependent upon the difference in the magnitudes of said currents, a control means responsive over a range of potentials exceeding a potential approximately equal to the potential corresponding to said maximum current difference and means for applying said potentials to said control means.

4. An electrical control system comprising an electron discharge means including two electron discharge paths each comprising an anode, a cathode and a control grid and each having different grid voltage-anode current characteristics such that for a predetermined voltage applied to the control grids relative to the cathodes the difference between the magnitudes of the respective anode currents is a maximum and for voltages on either side of said predetermined voltage the said current difference rapidly decreases, means for deriving from said currents a potential difference dependent upon said current difference, a control means arranged to be actuated only by a potential exceeding a predetermined value, and means for applying said last-mentioned potential difference to said control means.

5. An electrical control system comprising electron discharge means including first and second electron discharge paths each consisting of at least an anode, a cathode and a control electrode, means for applying predetermined potentials to said control electrodes of such values that small variations thereof cause but little difference in the value relative to one another of the plate currents flowing in said two paths, means for adding to said potentials a critical potential of such value that currents of substantially different magnitudes traverse the said paths, control means and means responsive to the difference in said currents for operating said control means.

6. A system in accordance with claim 5, wherein said electron discharge paths inherently have different characteristics and equal potentials are applied to the control electrodes thereof.

7. A system in accordance with claim 5, wherein said electron discharge paths inherently have the same characteristics and the control electrode of one path is provided with a fixed bias relative to that on the control electrode of the other path.

8. An electrical control system comprising electron discharge means including first and second electron discharge paths each consisting of at least an anode, a cathode and a third electrode, means for applying predetermined different potentials respectively to one of the electrodes of each of said first and second discharge paths, means for applying a critical potential to another of the electrodes included in each said discharge path of such value that currents of substantially different magnitudes traverse the said first and second paths, means for deriving from said last mentioned currents a potential difference, a control means, and relay means responsive to said potential difference for actuating said control means.

9. An electrical control system comprising electron discharge means including first and second electron discharge paths each consisting of at least an anode, a cathode and a third electrode, means for applying a potential to one of the electrodes of each of said first and second discharge paths, means for applying a critical potential to another of the electrodes included in each said discharge path of such value that currents of substantially different magnitudes traverse the said first and second paths, means for deriving from said last mentioned currents a potential difference, a transformer, means for applying said potential difference to the primary of said transformer and control means connected to the secondary of said transformer.

10. An electrical control system comprising a electron discharge means including first and second electron discharge paths, first and second circuits respectively including said first and second discharge paths, means for applying predetermined potentials to said paths of such value that currents of substantially different magnitudes traverse the said first and second circuits a transformer comprising three windings two of said windings being differentially arranged and respectively included in said first and second circuits, control means, and means responsive to a current of predetermined value through said third winding for actuating said control means.

11. An electrical control system according to claim 10, wherein said control means comprises a gas tube including an auxiliary gap and a main gap, means provided for deriving a starting potential from the current in said third winding for striking said auxiliary gap.

12. An electrical control system comprising a plurality of terminals, means for applying a predetermined potential to at least one of said terminals, a contacting means, and operating mechanism for causing said contacting means to make contact successively with said terminals, a first electron discharge means including first and second electron discharge paths, each consisting of at least an anode, a cathode and a control electrode, a second electron discharge means comprising a gas tube having an auxiliary control gap and a main discharge gap, a first circuit including said first discharge path, a second circuit including said second discharge path, a control relay, a third circuit including said main discharge gap and said control relay, means for applying predetermined different potentials respectively to one of the electrodes constituting each said first and second discharge paths, a connection from said contacting means to another of the electrodes constituting said first and second discharge paths, means for deriving voltages from said first and second circuits and for applying said voltages to electrodes constituting said auxiliary control gap, a circuit for controlling said operating mecahnism, and means under the control of said control relay for opening and closing said last-mentioned circuit.

13. A control circuit according to claim 12, wherein said means for applying predetermined different potentials to said respective control electrodes includes a resistance of such value that when said control electrodes tend to acquire such positive potentials with respect to the cathodes that grid currents flow, the respective control electrodes are both maintained at substantially zero potential.

14. An electrical control system comprising a gaseous discharge tube having a main discharge path comprising a first pair of electrodes and an auxiliary discharge path comprising a pair of starting electrodes, two resistances connected in series between said electrodes last mentioned and means for passing currents of different magnitudes through each of said resistances to produce a voltage drop across said pair of starting electrodes sufficient to fire the said tube.

15. An electrical control system comprising a first electron discharge means including first and second electron discharge paths each consisting of at least an anode, a cathode and a third electrode, a second electron discharge means comprising a gas tube having an auxiliary control gap and a main discharge gap, a first circuit including said first discharge path, a second circuit including said second discharge path, a third circuit including said main discharge gap, means for applying predetermined different potentials respectively to one of the electrodes of each of said first and second discharge paths, means for applying a critical potential to another of the electrodes of each of said discharge paths of such value that currents of substantially different magnitudes traverse the said first and second circuits, means for deriving from said last-mentioned currents a potential difference and for applying said potential difference across said auxiliary control gap whereby said gas tube is ionized and said gap is fired and current flows in said third circuit, a control means and means responsive to said current flow for actuating said control means.

16. An electrical control system comprising a thermionic emission electron discharge means including first and second electron discharge paths each comprising at least an anode, a cathode and a control electrode, a gas tube having a first pair of electrodes forming a main discharge gap and a second pair of electrodes forming an auxiliary discharge gap, a high tension source connected across the anode and cathode of each said discharge path and across said first pair of electrodes constituting said main discharge gap, a control relay in the external main discharge gap circuit, a first load resistance in the external anode cathode circuit of said first electron discharge path, a second load resistance in the external anode cathode circuit of said second electron discharge path, means for applying a potential developed across said first load resistance to one of the electrodes forming said auxiliary discharge gap and for applying a potential developed across said second load resistance to the other of said electrodes forming said auxiliary gap, means for applying predetermined different potentials to the said respective control electrodes with respect to said point of fixed potential of such value that a breakdown potential is developed across said auxiliary discharge gap whereby said gas tube is ionized and said control relay is energized.

17. An electrical control system comprising a thermionic emission electron discharge means including first and second electron discharge paths each comprising an anode a cathode and a control electrode, a gas tube having a first pair of electrodes forming a main discharge gap and a second pair of electrodes forming an auxiliary discharge gap, a high tension source connected across the anode and cathode of each said discharge path and across said first pair of electrodes constituting said main discharge gap, control means, a circuit including said main discharge gap, a first load resistance in the external anode cathode circuit of said first electron discharge path, a second load resistance in the external anode cathode of said second electron discharge path, means for applying a potential developed across said first load resistance to one of the electrodes forming said auxiliary discharge gap and for applying a potential developed across said second load resistance to the other of said electrodes forming said auxiliary gap, means for applying predetermined different potentials to the said respective control electrodes with respect to a point of fixed potential, and means for applying a potential to said cathode with respect to said point of fixed potential of such value that a breakdown potential is developed across said auxiliary discharge gap whereby said gas tube is ionized and a current flows in said main discharge gap circuit and means responsive to said current flow for actuating said control means.

18. An electrical control system comprising a plurality of control circuits each including a first electron discharge means comprising first and second electron discharge paths each consisting of at least an anode, a cathode and a third electrode, a second discharge means comprising a gas tube having an auxiliary control gap and a main discharge gap, a first circuit including said first discharge path, a second circuit including said second discharge path, a third circuit including said main discharge gap, control means responsive to current flow in said third circuit, means for deriving a potential difference from the currents flowing in said first and second circuits and for applying said potential difference across said auxiliary control gap, means for applying predetermined different pairs of potentials respectively to pairs of similar electrodes of each control circuit, a conductor connected in multiple to another of the electrodes of each said electron discharge path of all said control circuits and means for applying a predetermined critical potential to said conductor.

19. An electrical control system comprising a plurality of terminals, means for applying a predetermined potential to at least one of said terminals, a contacting means, an operating mechanism for causing said contacting means to make contact successively with said terminals, a first electron discharge means including first and second discharge paths, each consisting of at least an anode, a cathode and a control electrode, a second electron discharge means comprising a gas tube having an auxiliary control gap and a main discharge gap, a first circuit including said first discharge path, a second circuit including said second discharge path, a third circuit including said main discharge gap, control means electrically associated with said third circuit, means for applying predetermined different potentials respectively to one of the electrodes constituting each said first and second discharge paths, a connection from said contacting means to another of the electrodes constituting said first and second discharge paths, means for deriving voltages from said first and second circuits and for applying said voltages to electrodes constituting said auxiliary control gap, a circuit for controlling said operating mechanism, and means under the control of said control means for opening and closing said last-mentioned circuit.

20. An electrical control system comprising a plurality of control circuits each including a first electron discharge means comprising first and second electron discharge paths each consisting of at least an anode, a cathode and a control electrode, a second electron discharge means comprising a gas tube having an auxiliary control gap and a main discharge gap, a first circuit including said first discharge path, a second circuit including said second discharge path, a third circuit including said main discharge gap, control means responsive to current flow in said third circuit, and means for deriving a potential difference from the currents flowing in said first and second circuits and for applying said potential difference across said auxiliary control gap, means for applying predetermined different pairs of potentials respectively to the pairs of said control electrodes of each control circuit, a conductor connected in multiple to the cathodes of each said electron discharge path of all said control circuits and means for applying a predetermined critical potential to said conductor.

21. An electrical control system comprising a plurality of control circuits each including a first electron discharge means comprising first and second electron discharge paths, each consisting of at least an anode, a cathode, and a control electrode, a second electron discharge means comprising a gas tube having a first pair of electrodes forming an auxiliary control gap and a second pair of electrodes forming a main discharge gap, a first circuit including a load resistance and said first electron discharge path, a second circuit including a second load resistance and said second electron discharge path, means for applying a potential developed across said first load resistance to one of the electrodes forming said auxiliary control gap and for applying a potential developed across said second load resistance to the other of said electrodes forming said auxiliary control gap, a third circuit including said main discharge gap, and control means responsive to current flowing in said third circuit, means for applying predetermined different pairs of potentials respectively to the pairs of said control electrodes of each control circuit, a conductor connected in multiple to the cathodes of each said electron discharge path of all the control circuits and means for applying a predetermined critical potential to said conductor.

22. An electrical control system comprising a first electron discharge means including first and second electron discharge paths each consisting of at least an anode, a cathode and a third electrode, a second electron discharge means comprising a gas tube having an auxiliary control gap and a main discharge gap, a first circuit including said first discharge path, a second circuit including said second discharge path, a control relay, a third circuit including said main discharge gap and said control relay, means for applying predetermined different potentials respectively to one of the electrodes constituting each said first and second discharge paths, means for applying a critical potential to another of the electrodes constituting each said discharge path of such value that currents of substantially different magnitudes traverse the said first and second circuits, means for deriving from said last-mentioned currents a potential difference and for applying said potential difference across said auxiliary control gap whereby said gas tube is ionized, said main gap is fired and said control relay is energized.

23. In a telecommunication system, a selector switch comprising a plurality of test terminals, a brush, and a magnet for controlling the movement of said brush over said terminals, a control switch comprising first and second sets of terminals, first and second brushes for said control switch and means for moving said first and second brushes in unison to make contact with any predetermined pair of terminals of said first and second sets of terminals, means for applying predetermined potentials to said test terminals, means for applying predetermined potentials to the terminals of said first and second sets of terminals of said control switch such that the potentials applied to the respective terminals of each set of terminals are different but the potentials applied to each pair of terminals adapted to be simultaneously engaged by said first and second brushes differ by substantially the same amount, a first electron discharge means including first and second electron discharge paths each consisting of an anode, a cathode and a control electrode, a second electron discharge device comprising a gas tube having an auxiliary gap and a main discharge gap, a first circuit including said first discharge path, a second circuit including said second discharge path, a control relay, a third circuit including said main discharge gap and said control relay, a connection from said test wiper of said selector switch to the cathode of each said first and second discharge paths, connections extending from said first and second brushes of said control switch respectively to the control electrodes in said first and second discharge paths, means for deriving voltages from said first and second circuits and for applying said voltages to electrodes constituting said auxiliary control gap, and means actuated by the operation of said control relay for controlling the energization of said selector switch magnet.

GERALD DEAKIN.